Mar. 6, 1923.

T. J. COSTELLO.
PAIR HEATING FURNACE.
FILED OCT. 30, 1920.

Inventor
Thomas J. Costello,
By Bakewell, Byrnes, Parmelee
His Attorneys.

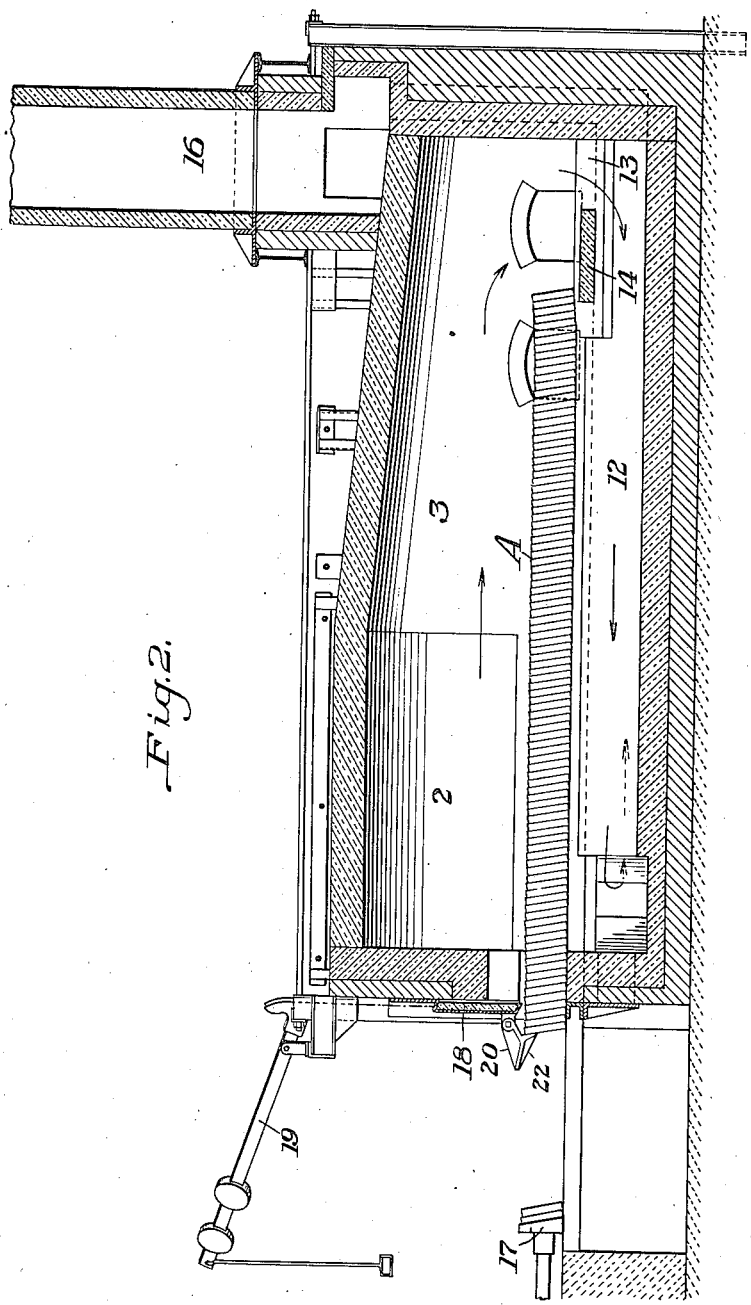

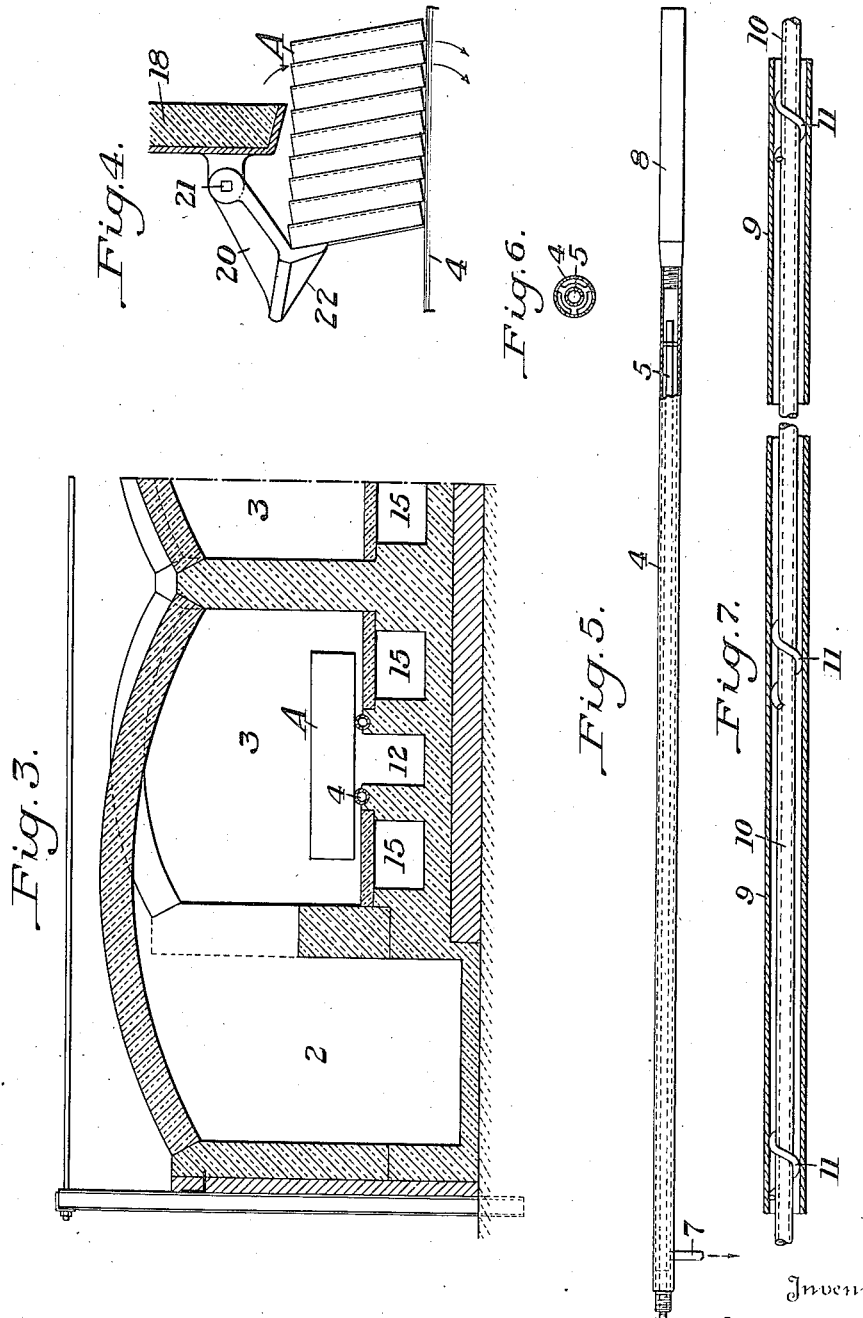

Mar. 6, 1923.
T. J. COSTELLO.
PAIR HEATING FURNACE.
FILED OCT. 30, 1920.
1,447,588.
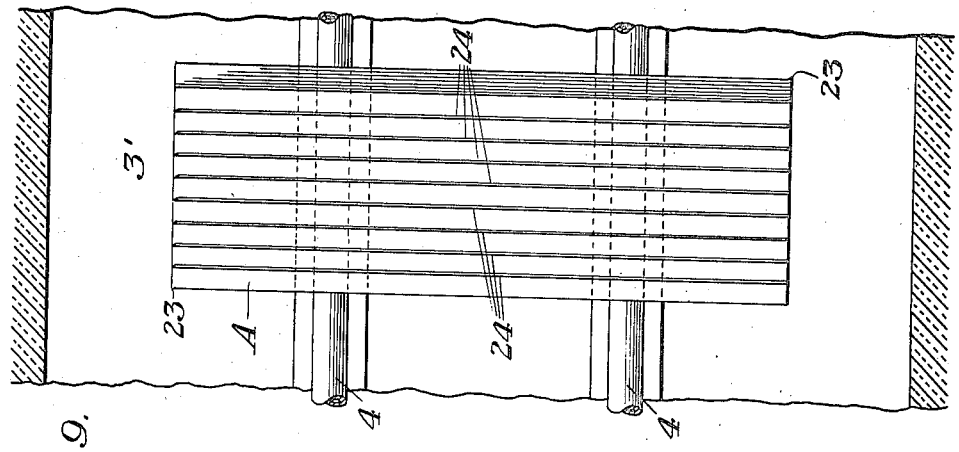
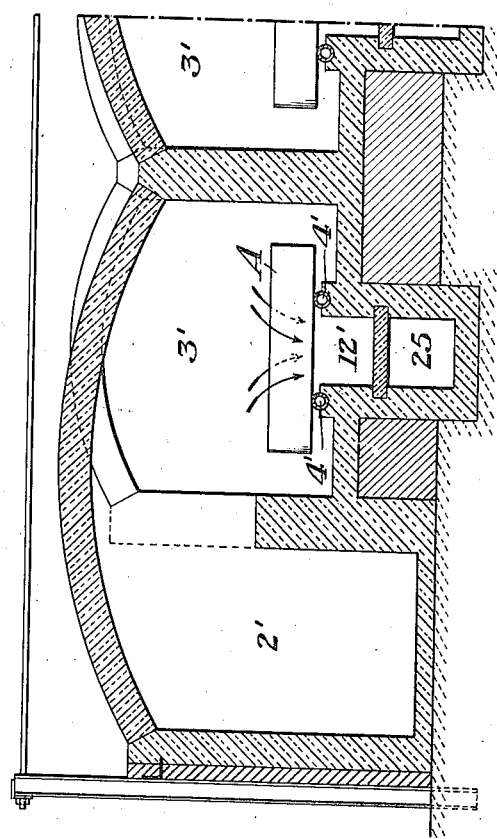

Patented Mar. 6, 1923.

1,447,588

UNITED STATES PATENT OFFICE.

THOMAS J. COSTELLO, OF WARREN, OHIO, ASSIGNOR TO TATE-JONES & COMPANY, INC., OF PITTSBURGH, PENNSYLVANIA, A CORPORATION OF PENNSYLVANIA.

PAIR-HEATING FURNACE.

REISSUED

Application filed October 30, 1920. Serial No. 420,593.

*To all whom it may concern:*

Be it known that I, THOMAS J. COSTELLO, a citizen of the United States, residing at Warren, in the county of Trumbull and State of Ohio, have invented a new and useful Improvement in Pair-Heating Furnaces, of which the following is a full, clear, and exact description.

The present invention has relation broadly to heating furnaces, and more particularly to pair-heating furnaces for heating sheet and tin plate bars, slabs or billets.

An object of the invention is to provide a furnace of this character in which the available heat of combustion is more completely made use of, and is so distributed in the furnace with respect to the material being heated as to give a better and more uniform heating action.

Another object of the invention is to so construct the furnace that the material being heated forms the division between adjacent flues, whereby the opposite sides of the material are directly subjected to the heated products of combustion.

A further object of the invention is to maintain the material being heated in inclined position whereby toppling over of the heating bars or slabs is prevented and the passage of heat between adjacent bars or slabs is facilitated.

A still further object of the invention is to utilize the projections formed on the material during shearing as separating means or spacers for adjacent thicknesses thereof.

An additional object of the invention is to decrease the period required for heat penetration of the material undergoing treatment.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 2 is a longitudinal vertical section on the line II—II of Figure 1.

Figure 3 is a transverse vertical section of the furnace and also shows a portion of an adjacent heating chamber.

Figure 4 is a detail sectional view showing a retaining device and a series of bars or slabs supported thereby.

Figure 5 is a plan view partly broken away of one of the water cooled skids.

Figure 6 is a transverse sectional view of the same on an enlarged scale.

Figure 7 is a longitudinal section of a modified form of skid.

Figure 8 is a transverse sectional view corresponding to Figure 3 and illustrating a slightly modified form of furnace, and Figure 9 is a top plan view of a series of bars or slabs in position within the furnace.

Figure 1:
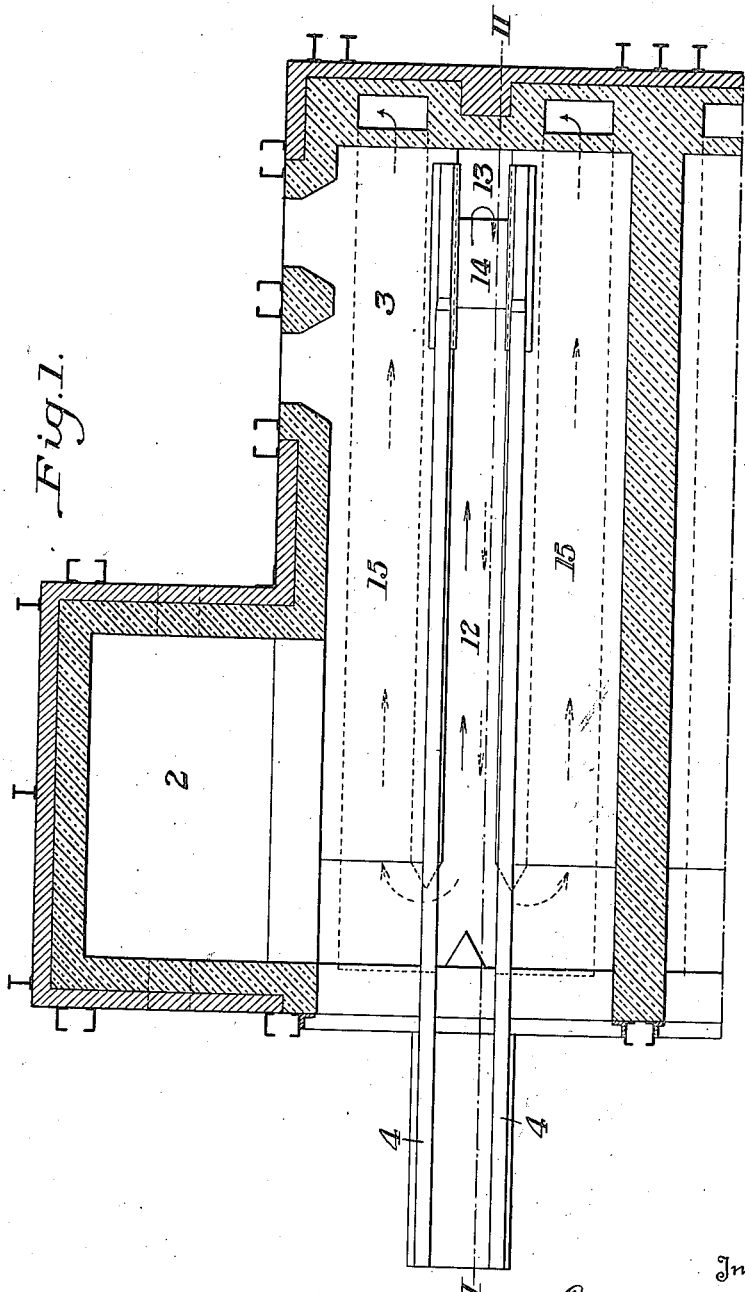
Figure 1 is a horizontal longitudinal section of a furnace embodying my invention.

Referring more particularly to the drawings, there is illustrated a combustion chamber 2, and a heating chamber 3 of a pair-heating furnace of the continuous type. The floor or hearth of the heating chamber 3 is provided with a slideway for the material to be heated, this slideway preferably being formed by water-cooled skids. In the form of invention illustrated in Figures 5 and 6, each of these skids comprises an outer pipe 4 and an inner pipe 5, the latter having an inlet 6 and the former an outlet 7, the two pipes being so arranged that the incoming water is discharged from the inner pipe into the outer pipe at a point well towards its end remote from the combustion chamber, while the outgoing water is taken off at the opposite end thereof. Preferably each skid will be provided at its delivery end with a solid non-cooled portion 8.

In the form illustrated in Figure 7, the skid consists of an outer pipe 9 and an inner pipe 10 extending therethrough, water being circulated continuously through the inner pipe but not passing out around such pipe. Suitable spacers 11 are provided for maintaining the two pipes in their spaced relation.

The hearth or floor of the furnace between the two skids is cut away to form a longitudinal open-top flue 12 which extends the entire length of the heating chamber and across which the bars or slabs A to be heated lie when supported on the skids. The products of combustion from the combustion chamber 2 pass out into the heating chamber 3 and thence directly over the tops of the bars or slabs, the major portion of the products passing to the discharge end of such chamber where they pass downwardly through the central opening 13, which communicates with one end of the open-top flue 12, said opening being formed at the end of a baffle plate 14. This baffle plate is preferably at a somewhat lower level than the adjacent floor of the chamber 3. The remaining portion of the products of combustion are drawn between the adjacent faces of the bars or slabs to directly heat the same as shown by the arrows in Figure 4, and as will be more particularly pointed out hereinafter.

The heated gases in passing backward through the flue 12 are utilized by direct contact with the under sides of the bars or slabs to further heat the same and thereby give a more uniform heating action, as well as utilizing considerable heat which would otherwise pass to the stack and be lost. At the receiving end of the furnace the waste gases diverge laterally as shown by the dotted arrows in Figure 1, and again pass toward the delivery end of the furnace through the side flues 15, one of these flues being arranged on each side of the open-top flue 12. In passing through these side flues, the gases impart still further heat to the floor or hearth of the chamber before escaping therefrom into the stack 16.

Any usual or suitable pusher device 17 may be provided for pushing the bars or slabs A to be heated into and through the heating chamber of the furnace, the pusher being formed with a sloping face for maintaining the material in inclined position. A suitable door 18 with actuating mechanism 19 therefor is utilized for closing the entrance to the heating chamber. The door 18 is provided with a retaining device which is shown as being in the form of a hooked arm 20, pivoted at 21, and adapted to fall by gravity into engagement with the outermost bar or slab and hold the same at the inclination given by the pusher 17. The lower face 22 of the hooked arm is beveled so that as the bars or slabs are pushed thereunder by the action of the pusher, the arm will readily move upwardly and permit the passage thereof. Immediately thereafter the arm will drop downwardly to catch the last bar or slab, as clearly shown in Figures 2 and 4, and maintain the entire series thereof in inclined relation. The bars or slabs are illustrated as being set on edge in a continuous manner, the inclination preventing the leading bars or slabs from toppling over and decreasing the area of contact between the bottom thereof and the skids.

By reference more particularly to Figures 4 and 9, it will be noted that the burrs 23 formed during the shearing operation are utilized for separating or spacing adjacent pieces of material to provide narrow passages 24 therebetween, these passages permitting the direct passage of a portion of the products of combustion, as has already been pointed out. It has been found that due to the relatively small area of these passages, oxidation of the flat surfaces of the material is prevented, although due to the more intimate contact with the heated products of combustion, the heat penetration period is considerably reduced. The passage of the products of combustion directly between adjacent bars or slabs is facilitated by the use of an open-top flue so that the material itself forms the division wall between oppositely moving streams of the heating medium.

In Figure 8 there is illustrated a slightly modified form of furnace in which parts corresponding to the parts already described are designated by the same reference characters having a prime affixed thereto. In this form of furnace the side flues are eliminated and the waste gases pass from the open-top flue 12′ into an underlying flue 25, which passes to the stack.

The method disclosed herein is made the subject matter of my co-pending application Serial No. 473,436, filed May 28th, 1921.

The advantages of the invention will be apparent to those familiar with the operation of furnaces of this character, since, by reason of the extra passes given the products of combustion they are prevented from going to the stack until their temperature has been greatly reduced and a large amount of their effective heat utilized. Further advantages arise from the method of passing the material through the furnace in inclined position and causing it to form a division wall between adjacent flues.

I claim:

1. A heating furnace having its heating chamber provided with a slideway and an open-top flue formed in the floor of said chamber between the members of said slideway, said flue having continuous closed sides and having communication at one end with the interior of the heating chamber and at its other end communicating with an outlet flue, said outlet flue extending longitudinally below the floor of the heating chamber, substantially as described.

2. A heating furnace having a heating chamber, a combustion chamber communicating with the heating chamber at one end portion of the latter, an open-top flue extending longitudinally in the hearth or floor of the heating chamber and communicating therewith at the end thereof opposite from the combustion chamber, and an outlet flue communicating with the open-top flue at the combustion chamber end of the furnace, substantially as described.

3. A heating furnace having its heating chamber formed with a centrally arranged open-top flue extending longitudinally in the floor or hearth thereof, means for supporting the billets to be heated transversely of said flue and exposed at their under side to the heating action thereof, and means for circulating the products of combustion through said flue after they have passed through the heating chamber above the billets, substantially as described.

4. A heating furnace having a longitudinally extending heating chamber, an open-top flue formed in the floor of the heating chamber longitudinally thereof, means for supporting the billets to be heated transversely across said flue, and return flues also formed in the floor of said chamber, one at either side of the open-top flue, the latter having communication with the heating chamber at one end and with the return flues at the opposite end, substantially as described.

5. A heating furnace having its heating chamber formed with an open-top flue, means for supporting the material to be heated above said flue and means for causing a heating medium to flow over the material so supported and then to flow back through said flue in contact with the under side of said material, substantially as described.

6. A heating furnace having its heating chamber formed with an open-top flue, means for supporting the material to be heated above said flue and transversely thereof and means for causing a heating medium to flow over the material so supported and then to flow back through said flue in contact with the under side of said material, substantially as described.

7. A heating furnace having its heating chamber formed with an open top flue, means for supporting the bars or slabs to be heated in inclined edgewise positions transversely across the top of said flue, and means for first passing the heating medium above said bars or slabs and for subsequently passing the same heating medium below said bars or slabs in contact with the lower sides thereof, substantially as described.

8. A heating furnace having its heating chamber formed with an open-top flue, means for supporting the material to be heated above said flue, and means for passing a heating medium above and below said material in opposite directions, substantially as described.

9. A heating furnace having its heating chamber formed with an open top flue, and means for supporting the material to be heated above said flue in inclined position, substantially as described.

10. A heating furnace having its heating chamber formed with an open-top flue, means for supporting the material to be heated above the flue and in partially open relation thereto, and means for causing a heating medium to flow over the material so supported with partial short - circuiting through the material into the open-top flue and then to flow back through said flue in contact with the under side of said material, substantially as described.

11. A heating furnace having its heating chamber formed with an open-top flue, means for supporting the material to be heated above said flue and in relation thereto to allow short-circuiting of part of the gases into the flue, means for feeding the material along the supports, and means for causing a heating medium to flow over the material so supported with partial short-circuiting into the flue and then to flow back through said flue in contact with the under side of said material, substantially as described.

In testimony whereof, I have hereunto set my hand.

THOMAS J. COSTELLO.